(12) United States Patent
Iwamoto et al.

(10) Patent No.: US 10,859,478 B2
(45) Date of Patent: Dec. 8, 2020

(54) BIAXIAL LOAD TEST SPECIMEN, BIAXIAL LOAD TEST APPARATUS, AND BIAXIAL LOAD TEST METHOD

(71) Applicant: MITSUBISHI HEAVY INDUSTRIES, LTD., Tokyo (JP)

(72) Inventors: Yoichi Iwamoto, Tokyo (JP); Kaina Teshima, Tokyo (JP); Kohei Yamamoto, Tokyo (JP); Hiroyuki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 233 days.

(21) Appl. No.: 16/084,304

(22) PCT Filed: Feb. 23, 2017

(86) PCT No.: PCT/JP2017/006907
§ 371 (c)(1),
(2) Date: Sep. 12, 2018

(87) PCT Pub. No.: WO2017/169372
PCT Pub. Date: Oct. 5, 2017

(65) Prior Publication Data
US 2019/0072467 A1 Mar. 7, 2019

(30) Foreign Application Priority Data
Mar. 28, 2016 (JP) ................. 2016-063749

(51) Int. Cl.
*G01N 3/08* (2006.01)
(52) U.S. Cl.
CPC ....... *G01N 3/08* (2013.01); *G01N 2203/0017* (2013.01); *G01N 2203/0254* (2013.01);
(Continued)

(58) Field of Classification Search
CPC .... G01N 3/08; G01N 3/28; G01N 2203/0272; G01N 2203/0298; G01N 2203/04;
(Continued)

(56) References Cited

U.S. PATENT DOCUMENTS

| 5,144,844 A | 9/1992 | Mathiak et al. |
| 5,279,166 A | 1/1994 | Ward et al. |

(Continued)

FOREIGN PATENT DOCUMENTS

| CA | 2000833 A1 * | 4/1991 |
| CN | 101251453 A | 8/2008 |

(Continued)

OTHER PUBLICATIONS

Supplementary partial European Search Report dated Oct. 9, 2019, issued in counterpart EP Application No. 17 77 3917.4. (13 pages).
(Continued)

*Primary Examiner* — Tarun Sinha
(74) *Attorney, Agent, or Firm* — Westerman, Hattori, Daniels & Adrian, LLP

(57) ABSTRACT

A biaxial load test specimen includes a main body and four arms. The main body has a plurality of through-holes aligned along axial directions of two load axes orthogonal to each other. The four arms extend from the main body in the respective axial directions of the load axes. Each of the arms has a plurality of slit grooves extending, on respective extensions of the through-holes aligned in the axial directions, along the respective axial directions.

8 Claims, 8 Drawing Sheets

(52) U.S. Cl.
CPC ............... *G01N 2203/0262* (2013.01); *G01N 2203/0272* (2013.01); *G01N 2203/0298* (2013.01); *G01N 2203/04* (2013.01)

(58) Field of Classification Search
CPC ... G01N 2203/0017; G01N 2203/0254; G01N 2203/0262
USPC .......................................................... 73/826
See application file for complete search history.

(56) References Cited

U.S. PATENT DOCUMENTS

| | | | |
|---|---|---|---|
| 5,297,441 | A | 3/1994 | Smith et al. |
| 6,860,156 | B1 | 3/2005 | Cavallaro et al. |
| 8,671,771 | B2 | 3/2014 | Hanabusa |
| 2008/0034885 | A1 | 2/2008 | Monteiro et al. |
| 2009/0282929 | A1 | 11/2009 | Abu-Farha et al. |
| 2011/0314926 | A1 | 12/2011 | Hanabusa |
| 2015/0253227 | A1* | 9/2015 | Takeda ............... G01N 3/08 73/788 |
| 2015/0330882 | A1 | 11/2015 | Kaneda |
| 2018/0238784 | A1* | 8/2018 | Lin ...................... G01N 3/10 |

FOREIGN PATENT DOCUMENTS

| | | |
|---|---|---|
| CN | 201199211 Y | 2/2009 |
| CN | 101893532 B | 4/2012 |
| EP | 0660100 A2 | 6/1995 |
| FR | 2194965 A1 | 3/1974 |
| FR | 2579327 A1 | 9/1986 |
| GB | 1512614 A | 6/1978 |
| JP | H10-010025 A | 1/1998 |
| JP | H11-94721 A | 4/1999 |
| JP | 2000-180322 A | 6/2000 |
| JP | 2014-228290 A | 12/2014 |
| JP | 2015-169578 A | 9/2015 |
| WO | 2012/080675 A1 | 6/2012 |

OTHER PUBLICATIONS

Extended (Supplementary) European Search Report dated Jan. 24, 2020, issued in counterpart EP Application No. 17773917.4. (16 pages).
Written Opinion dated Apr. 18, 2017, issued in counterpart application No. PCT/JP 2017/006907, with English translation. (9 pages).
International Search Report dated Apr. 18, 2017, issued in counterpart application No. PCT/JP2017/006907. (2 pages).

* cited by examiner

BIAXIAL LOAD TEST SPECIMEN, BIAXIAL LOAD TEST APPARATUS, AND BIAXIAL LOAD TEST METHOD

FIELD

The present invention relates to a biaxial load test specimen to which loads are applied along the axial directions of two load axes orthogonal to each other, a biaxial load test apparatus, and a biaxial load test method.

BACKGROUND

There is generally known a biaxial tensile test (biaxial load test) method for directly measuring stress-strain characteristics of a material under biaxial stress in pressed-component design or die design. In such a biaxial tensile test method, use is made of a cross-shaped test specimen (a biaxial load test specimen) that includes main body in which two load axes are orthogonal to each other, and four arms extending from the main body along the respective axial directions of the load axes. Each of the four arms of this conventional cross-shaped test specimen is provided with a slit in order to generate stress fields uniformly in the axial directions of the load axes and thereby cause the main body to be in a desired biaxial stress state (for example, see Patent Literature 1). A larger slit-width causes a larger partial-loss in the cross section of the arm, whereby a slit portion breaks first, so that a sufficient load cannot be applied to an evaluation unit. Therefore, the slit-width needs to be smaller as much as possible and hence the slit is generally processed by expensive wire cutting.

CITATION LIST

Patent Literature

Patent Literature 1: Japanese Patent Application Laid-open No. 2014-228290

SUMMARY

Technical Problem

In recent years, there has been searched for an analysis of stresses generated in a plurality of through-holes formed in a perforated plate such as a tube plate of a heat exchanger by using the above-described biaxial tensile test (biaxial load test) method. Also in the configuration in which a plurality of through-holes is provided in the main body, each of four arms needs to be provided with a slit in order to generate stress fields uniformly in the axial directions of the load axes. However, in the configuration in which a plurality of through-holes is provided in the main body, a tensile or compressive load (stress) applied to the main body is placed on a ligament except the through-holes, and hence, the load is preferably transmitted to this ligament smoothly.

The present invention has been made in view of the above, and an object of the present invention is to provide a biaxial load test specimen capable of transmitting a load smoothly to the ligament of the main body, except the through-holes, a biaxial load test apparatus, and a biaxial load test method.

Solution to Problem

To solve the problem described above and achieve the object, a biaxial load test specimen according to the present invention includes a main body having a plurality of through-holes aligned along axial directions of two load axes orthogonal to each other; and four arms extending from the main body in the respective axial directions of the load axes. Each of the arms has a plurality of slit grooves extending, on respective extensions of the through-holes aligned in the axial directions, along the respective axial directions.

With this configuration, each of the arms has a plurality of slit grooves extending, on the respective extensions of the through-holes aligned in axial directions, along the respective axial directions, and thus, a load applied to each of the arms acts on the ligament of the main body, except the through-holes, through between the slit grooves. Therefore, a load can be smoothly transmitted to the ligament.

In this configuration, it is preferable that a center line of each slit groove is positioned on a corresponding extension of the through-holes. With this configuration, the center line of the arm between the slit grooves coincides with the center line of the ligament of the main body, except the through-holes, and accordingly, a load can be smoothly transmitted to the ligament.

Furthermore, it is preferable that the slit grooves have a groove width equal to a diameter of the through-holes. With this configuration, the slit has a larger width than a wire-cut slit, and therefore the slit groove can be machined, resulting in a reduction in processing cost.

Furthermore, the present invention is a biaxial load test apparatus configured to perform a load test for a test specimen by applying a load to the test specimen along each of axial directions of a first load axis and a second load axis which are orthogonal to each other. The apparatus includes a first frame including a first loading unit configured to apply a tensile or compressive load to the test specimen along the axial direction of the first load axis; a second frame including a second loading unit configured to apply a tensile or compressive load to the test specimen along the axial direction of the second load axis; a first sliding unit configured to slide the first frame in the axial direction of the first load axis with respect to an installation surface; and a second sliding unit configured to slide the second frame in the axial direction of the second load axis with respect to the installation surface.

With this configuration, reaction forces of loads applied to the test specimen in the axial directions respectively act on the first frame and the second frame, so that the first frame and the second frame are moved by the first sliding unit and the second sliding unit, respectively, in respective opposite directions to the directions in which the loads are applied. Thus, a combined biaxial load is prevented from being applied to the arms of the test specimen, so that a pure load can be applied to each of the arms along a corresponding one of the axial directions.

The present invention is a biaxial load test apparatus configured to perform a load test for a test specimen by applying a load to the test specimen along each of axial directions of a first load axis and a second load axis which are orthogonal to each other. The apparatus includes a frame to be installed on an installation surface; a first loading unit configured to apply a tensile or compressive load to the test specimen along the axial direction of the first load axis; a second loading unit configured to apply a tensile or compressive load to the test specimen along the axial direction of the second load axis; a first sliding unit configured to slide the first loading unit and the test specimen in the axial direction of the second load axis with respect to the frame; and a second sliding unit configured to slide the second loading unit and the test specimen in the axial direction of the first load axis with respect to the frame.

Furthermore, it is preferable that the test specimen includes a main body having a plurality of through-holes aligned along axial directions of two load axes orthogonal to each other, and four arms extending from the main body in the respective axial directions of the load axes, wherein each of the arms has a plurality of slit grooves extending, on respective extensions of the through-holes aligned in the axial directions, along the respective axial directions.

Furthermore, a biaxial load test method according to the present invention includes the steps of: providing at least one of the through-holes formed in the main body of the biaxial load test specimen described above with a sealing plug configured to seal the at least one of the through-holes; applying a load to the arms of the biaxial load test specimen along the respective axial directions of the load axes; and in a state where the load is applied, applying a pulling load to pull out the sealing plug from the through-hole.

This configuration allows an accurate understanding of behaviors such as deformation of the through-holes formed in the main body in a state in which loads are applied to the respective arms of the biaxial load test specimen along the respective axial directions of the load axes.

Furthermore, a biaxial load test method according to the present invention includes the steps of: fixing a pipe to at least one of the through-holes formed in the main body of the biaxial load test specimen described above; applying a load to the arms of the biaxial load test specimen along the respective axial directions of the load axes; and in a state where the load is applied, filling one end side of the pipe with a fluid pressurized to a predetermined pressure.

This configuration allows an accurate understanding of behaviors such as deformation of the through-holes formed in the main body in a state in which loads are applied to the respective arms of the biaxial load test specimen along the respective axial directions of the load axes.

Advantageous Effects of Invention

According to the present invention, each of the arms has a plurality of slit grooves extending, on the respective extensions of the through-holes aligned in axial directions, along the respective axial directions, and thus, loads applied to the respective arms act on the ligament of the main body, except the through-holes, through between the slit grooves. Thus, loads can be smoothly transmitted to the ligament.

DESCRIPTION OF EMBODIMENTS

Hereinafter, embodiments of the present invention will be described in detail with reference to the drawings. Note that the present invention is not limited by the embodiments. In addition, constituent elements in the following embodiments include those that can be easily replaced by those skilled in the art or substantially the same. Furthermore, the constituent elements described below can be appropriately used in combination.

Figure 1:
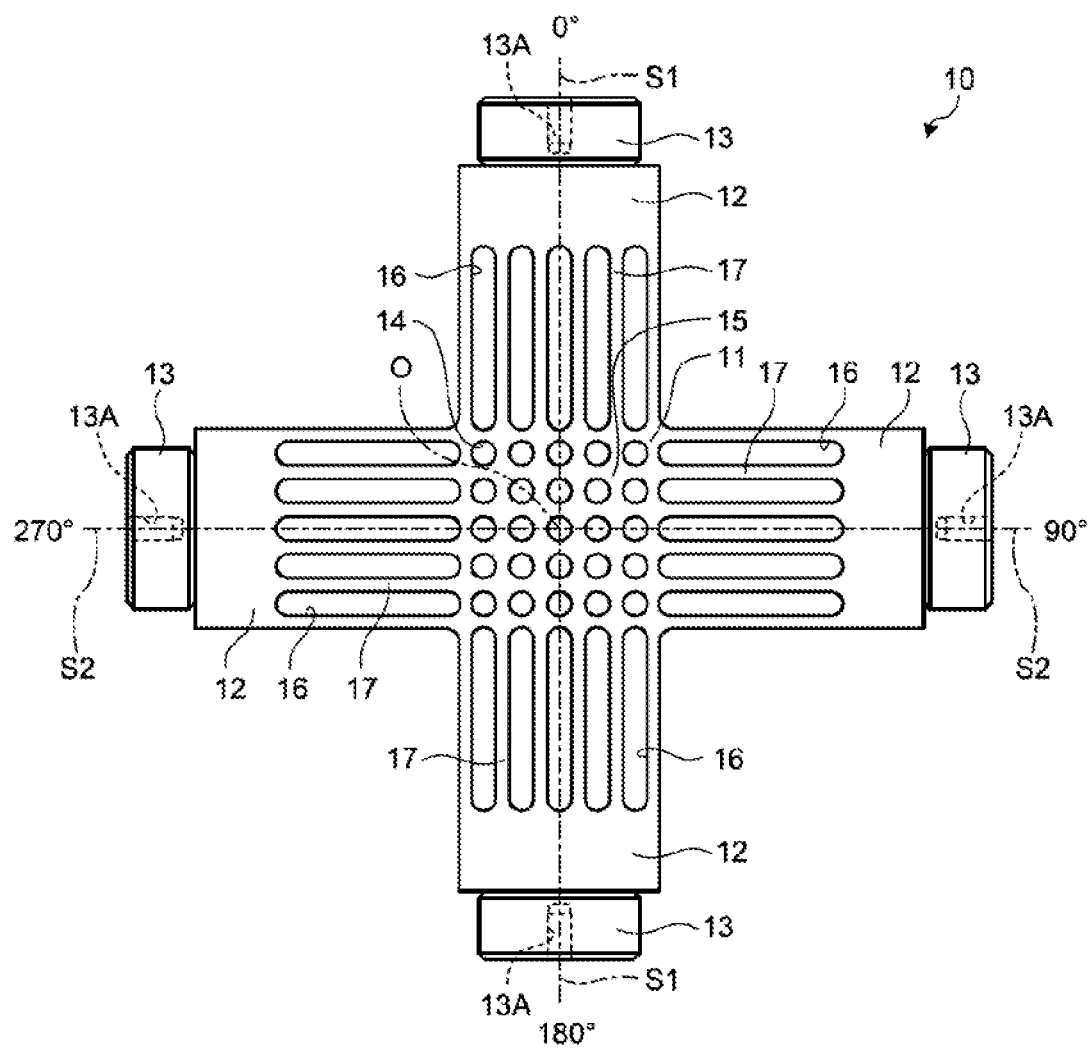
FIG. 1 is a plan view of a cross-shaped test specimen according to an embodiment.
Figure 2:
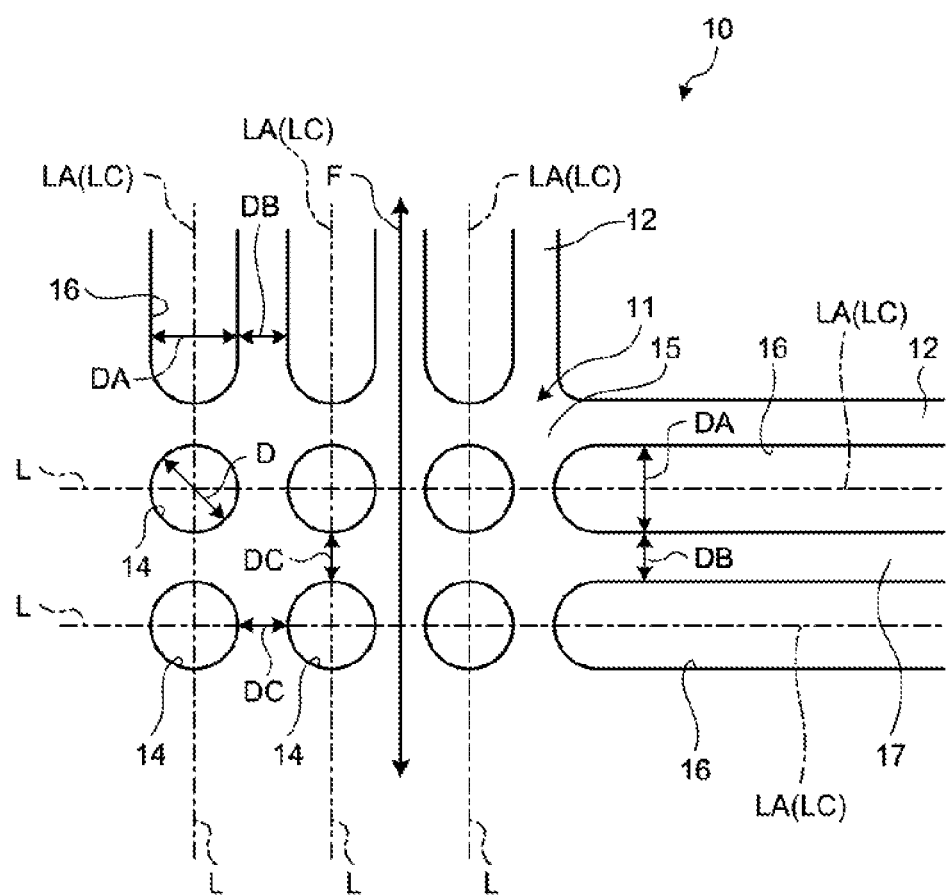
FIG. 2 is a partially enlarged view of the cross-shaped test specimen.

FIG. 1 is a plan view of a cross-shaped test specimen according to the present embodiment. FIG. 2 is a partially enlarged view of the cross-shaped test specimen. As illustrated in FIG. 1, a cross-shaped test specimen (biaxial load test specimen) 10 includes a main body 11 in which a first load axis S1 and a second load axis S2 intersecting at right angles; four arms 12 each extending from the main body 11 along the axial direction of the first load axis S1 or the second load axis S2; and a coupling unit 13 provided in each of the arms 12, in which the main body 11, the four arms 12, and the coupling unit 13 are integrated. The first load axis S1 and the second load axis S2 are orthogonal to each other. The four arms 12 extend in different directions shifted by every 90 degrees around the main body 11. Each of the coupling units 13 includes a hole 13A to which a loading unit (not illustrated) configured to apply tensile or compressive loads (stresses) in the axial directions of the first load axis S1 and the second load axis S2 is coupled.

The main body 11 is a plate-like object formed in an approximately rectangular shape, and functions as an evaluation area to evaluate a stress generated in the main body 11 when tensile or compressive loads are applied in the axial directions of the first load axis S1 and the second load axis S2. In the present embodiment, the main body 11 is configured to imitate, for example, a tube plate of a heat exchanger, and formed so as to have a larger thickness (for example, 30 mm to 150 mm) than a plate material for pressing. The main body 11 has a plurality of through-holes 14 arranged in a square matrix (in the example illustrated in FIG. 1, arranged in five rows (5×5)). These through-holes 14 each imitate a hole to which a heat transfer tube of a heat exchanger (not illustrated) is connected, and are formed so as to be aligned along the axial directions of the first load axis S1 and the second load axis S2. The through-holes 14 are required to be arranged in at least two rows (2×2), and preferably arranged in three (3×3) or more rows, in which, more preferably, a center through-hole 14 is positioned at the intersection (the center) O of the first load axis S1 and the second load axis S2.

The arms 12 have the function of transmitting a load applied in the axial direction of the first load axis S1 or the second load axis S2 to the main body 11, and are formed so as to have the same thickness as the main body 11. As illustrated in FIG. 1, each of the arms 12 is provided with a plurality of slit grooves 16 extending along a direction in which the arm 12 extends, that is, along the axial direction of the first load axis S1 or the second load axis S2. The slit grooves 16 generate stress fields uniformly in the axial directions of load axes S1 and S2 in the main body 11. Here, in a configuration in which a plurality of through-holes 14 are formed in the main body 11, as indicated by an arrow F in FIG. 2, a tensile or compressive load applied to the main body 11 is placed on the ligament 15 except the through-holes 14, and therefore, the load is preferably smoothly transmitted to this ligament 15.

In the present embodiment, as illustrated in FIG. 2, each of the slit grooves 16 is positioned on an extension LA, that is, on the extension of a line L connecting the centers of the through-holes 14 aligned in the axial direction of the first load axis S1 or the second load axis S2. Accordingly, a load applied to the arm 12 acts on the ligament 15 of the main body 11 via a portion 17 between the slit grooves 16 and 16 adjoining each other, and thus the load can be smoothly transmitted to the ligament 15.

In the present embodiment, each of the slit grooves 16 is formed so that a center line LC of the slit groove 16 coincides with the above-described extension LA. Thus, the portion 17 between the slit grooves 16 and 16 in the arm 12 and the ligament 15 in the main body 11 are positioned to be lined up straight, whereby a load can be smoothly transmitted to the ligament 15.

In the present embodiment, as illustrated in FIG. 2, each of the slit grooves 16 is formed to have a groove width DA equal to a diameter D of the through-holes 14. This configuration allows a width DB of the portion 17 between the slit grooves 16 and 16 to be equal to a ligament width DC between the through-holes 14 and 14. Thus, a load applied to the arm 12 can be more smoothly transmitted to the ligament 15. Furthermore, the groove width DA of the slit grooves 16 is much larger than the width of a conventional slit made by wire cutting, and accordingly, the slit groove can be machined, which results in a reduction in processing cost. In particular, in the present embodiment, the arms 12, as well as the main body 11, are formed to have a larger thickness than a plate material for pressing, and accordingly a greater effect in reducing processing cost is produced. Here, in the case where the groove width DA of the slit grooves 16 is made larger, a larger partial-loss in the cross section of the arm 12 is caused, which could lead to a risk of a breakage of the arm 12. In the present embodiment, a breakage test is conducted not by applying a load to the cross-shaped test specimen 10 in a biaxial direction, but, a stress produced in the through-holes 14 when a load is applied is analyzed, and hence, even when the groove width DA of the slit grooves 16 is made equal to the diameter D of the through-holes 14, there is no problem in testing.

Next, a biaxial load test using the cross-shaped test specimen 10 will be described. In the present embodiment, a test for evaluating a stress produced in the through-hole 14 provided in the main body 11 is conducted in a state in which a load is applied to the cross-shaped test specimen 10 in the axial direction of the first load axis S1 or the second load axis S2. As described above, since the main body 11 imitates a tube plate of a heat exchanger, a test is conducted, for example, to see how a predetermined through-hole 14 (for example, a center through-hole 14) behaves when a stress is generated in each direction on a tube plate of a heat exchanger during the operation of a plant including the heat exchanger.

Figure 3:
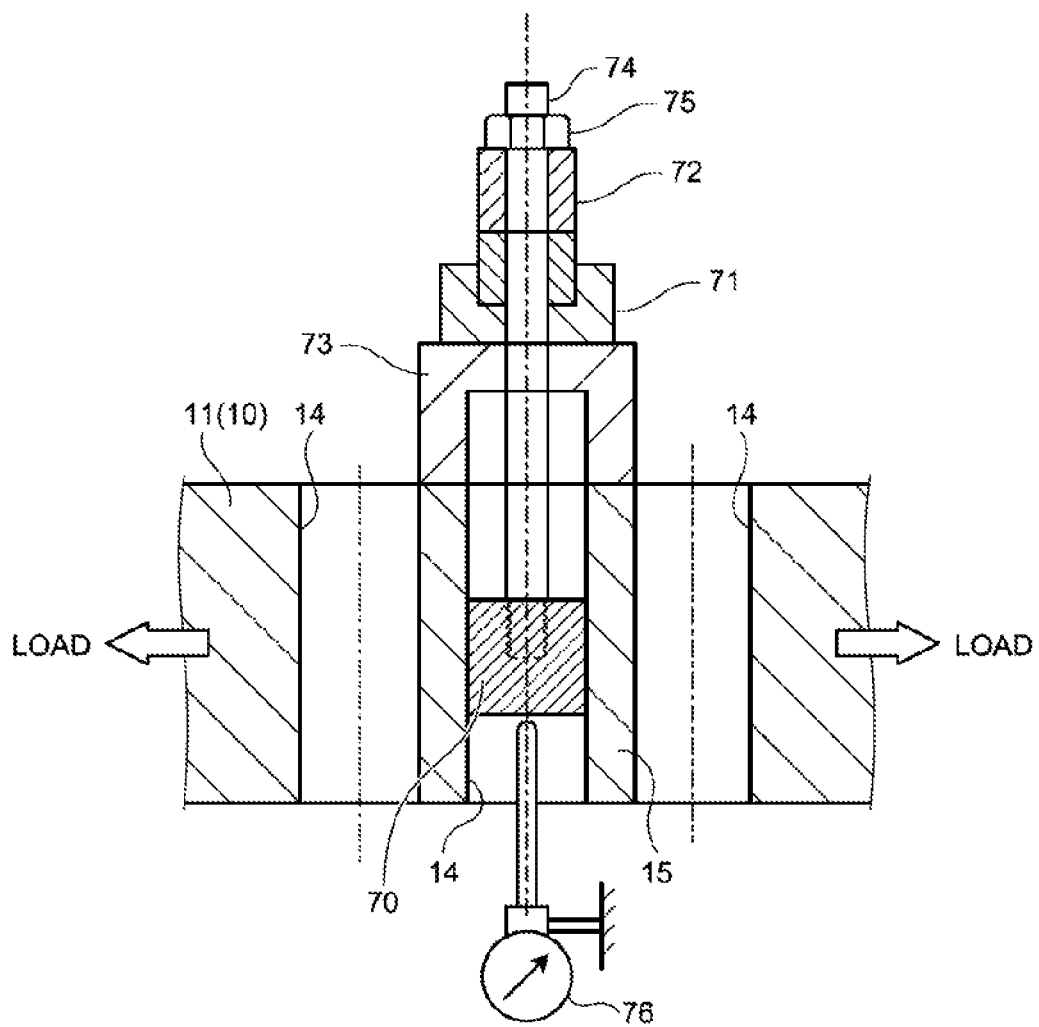
FIG. 3 is a schematic diagram illustrating a test of pulling out a sealing plug provided in a through-hole of the cross-shaped test specimen.

FIG. 3 is a schematic diagram illustrating a test of pulling out a sealing plug provided in a through-hole of the cross-shaped test specimen. As illustrated in FIG. 3, a center through-hole 14 provided at the center of the main body 11 of the cross-shaped test specimen 10 is provided with a sealing plug 70 for sealing the through-hole 14. Subsequently, a pulling rod 74 is connected to the upper side of the sealing plug 70. This pulling rod 74 penetrates a reaction-force base 73 disposed on the main body 11 (the ligament) of the cross-shaped test specimen 10, a center-hole jack 71, and a center-hole load cell 72, and is fixed with a nut 75. A displacement gauge 76 is provided on the lower side of the sealing plug 70, that is, on the opposite side of sealing plug 70 to the side on which the pulling rod 74 is provided.

The pulling test is performed in such a manner that, in a state in which loads in the directions of the first load axis S1 and the second load axis S2 are applied to the cross-shaped test specimen 10, a pulling load is imposed on the sealing plug 70 by the center-hole jack 71. Then, a pulling load value at the time when the sealing plug 70 is displaced (starts to move) with the displacement gauge 76 is measured by the center-hole load cell 72. With this configuration, for example, when a stress is generated in each direction on a tube plate of a heat exchanger, the load-carrying capacity of the sealing plug 70 provided in a predetermined through-hole 14 (for example, a center through-hole 14) can be determined, and furthermore, how the through-hole 14 behaves can be accurately understood. The pulling test may be performed not only by measuring a pulling load value by using the center-hole load cell 72, but also by determining whether the sealing plug 70 can be pulled out (displaced) or not pulled out (not displaced) in a state in which a fixed pulling load is applied.

Figure 4:
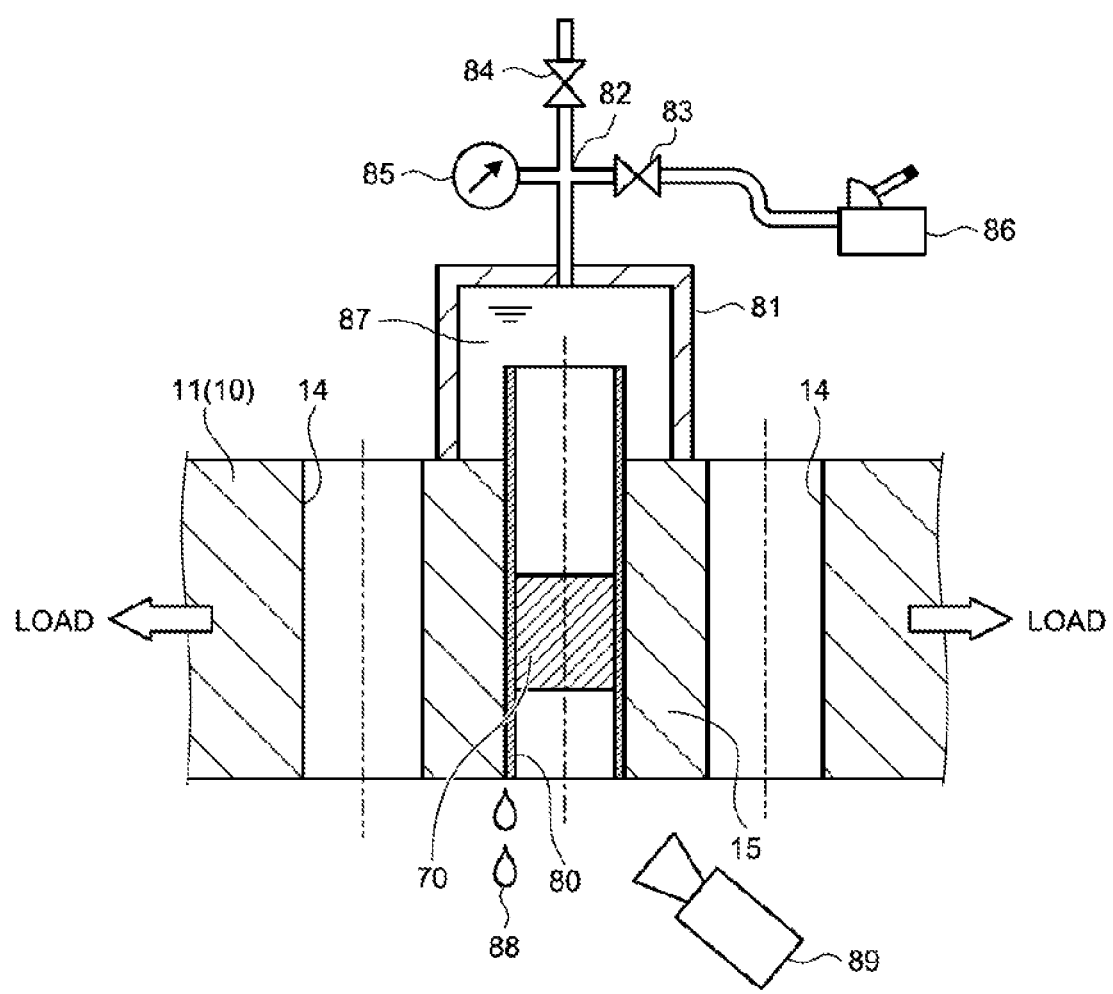
FIG. 4 is a schematic diagram illustrating a test of leakage from a pipe provided in a through-hole of the cross-shaped test specimen.

FIG. 4 is a schematic diagram illustrating a test of leakage from a pipe provided in a through-hole of the cross-shaped test specimen. As illustrated in FIG. 4, a heat transfer tube (pipe) 80 is attached (fixed) to a center through-hole 14 provided at the center of the main body 11 of the cross-shaped test specimen 10. The heat transfer tube 80 is attached to the through-hole 14 of the main body 11 by a fixing means, such as tube expanding, soldering, or welding. The fixing means is the same as a means for attaching a heat transfer tube to a tube plate of a heat exchanger. Subsequently, the sealing plug 70 is attached to the inner surface of the heat transfer tube 80.

On the upper side of the main body 11 (the ligament 15), a vessel 81 is fixed by a fixing means, such as welding, pressing, or adhesion, so as to cover one end of the heat transfer tube 80. The vessel 81 is connected to a pipe 82 communicating with an interior space. The pipe 82 is connected to a pressure pump 86, a valve 83, an air vent valve 84, and a pressure gauge 85. Below the main body 11, an observation means, such as a video camera 89, is provided on the other end side of the heat transfer tube 80 across the sealing plug 70.

A leakage test is performed in such a manner that, in a state in which loads are applied to the cross-shaped test specimen 10 in the directions of the first load axis S1 and the second load axis S2, the air vent valve 84 is closed, the vessel 81 is filled with a fluid (for example, water) 87, and the fluid 87 is pressurized with a pressure pump. Thus, one end side of the heat transfer tube 80, the end being positioned inside the vessel 81, is filled with the pressurized fluid 87. When the pressure of the fluid 87 reaches a predetermined pressure, then the valve 83 is closed to maintain the pressure of the fluid 87. On the other end side of the heat transfer tube 80 across the sealing plug 70, whether a leakage 88 of the pressurized fluid 87 has been caused is observed based on images captured by the video camera 89. This configuration allows, for example, an accurate understanding of how the heat transfer tube 80 provided in a predetermined through-hole 14 (for example, the center through-hole 14) behaves when a stress is generated in each direction on a tube plate of a heat exchanger.

In the case where tensile or compressive loads are applied to the cross-shaped test specimen 10 in the axial directions of the first load axis S1 and the second load axis S2, when the loads in the axial directions are combined and applied to the arms 12 of the cross-shaped test specimen 10, a test cannot be accurately conducted. Therefore, there is assumed a configuration in which each of the arms 12 of the cross-shaped test specimen 10 is provided with a loading unit (not illustrated) configured to apply a tensile or compressive load in an axial direction. However, this configuration causes the problem that the apparatus has a more complicated structure. Therefore, a technique of applying loads in four directions by using a single loading unit has been proposed (for example, Japanese Patent Application Laid-open No. 58-173450). However, according to the conventional configuration, there is the problem that loads cannot be applied independently to the axial directions of the first load axis S1 and the second load axis S2. Therefore, there has been desired a biaxial load test apparatus having a simpler structure and capable of preventing a combined biaxial load from being applied to the arms 12 of the cross-shaped test specimen 10 as well as capable of applying loads independently to the axial directions.

Figure 5:
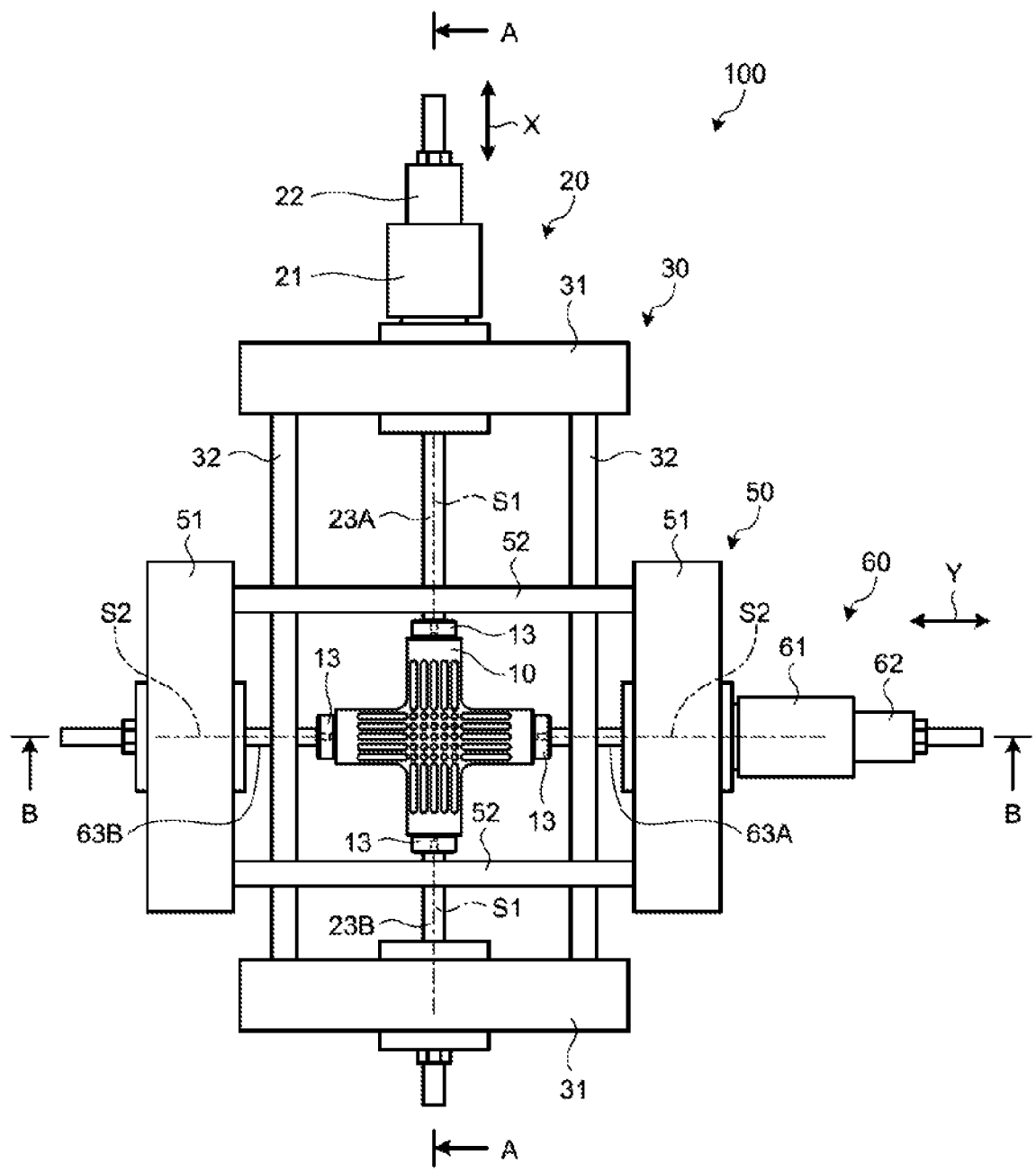
FIG. 5 is a plan view of a biaxial load test apparatus suitable for a biaxial load test for the cross-shaped test specimen.
Figure 6:
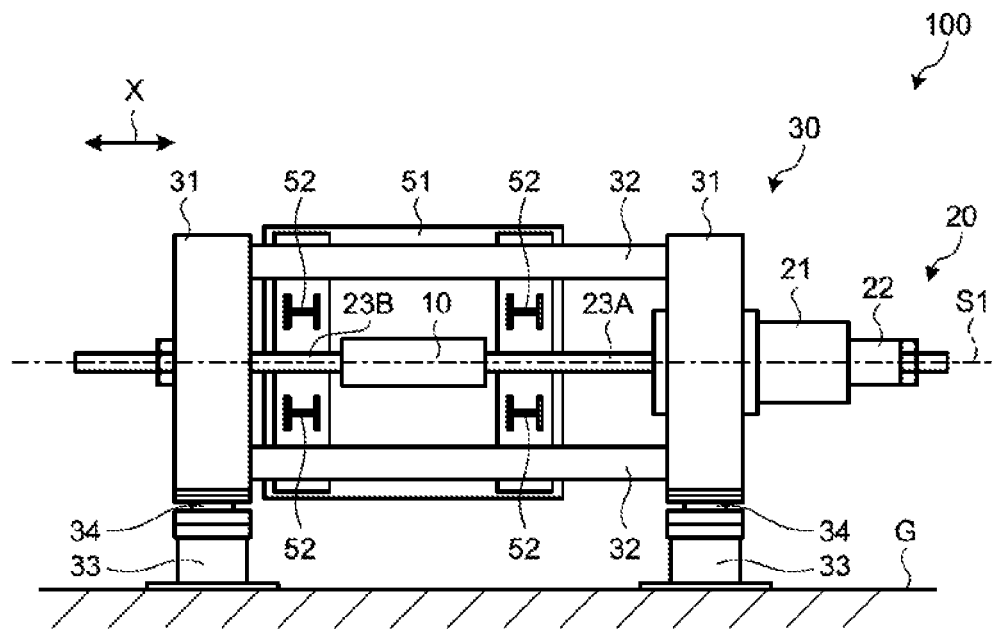
FIG. 6 is a cross-sectional view taken along a line A-A in FIG. 5.
Figure 7:
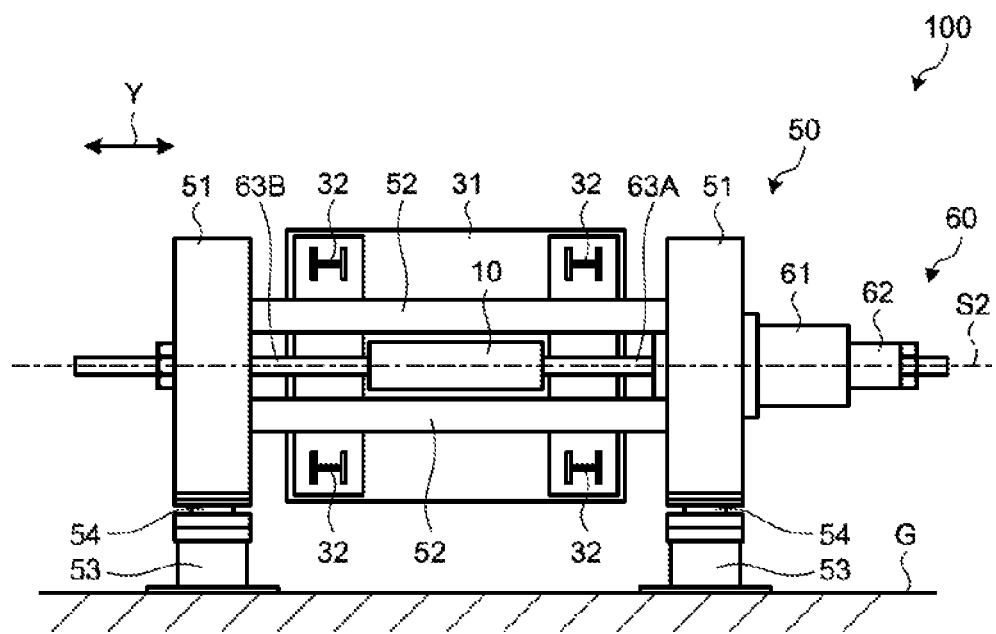
FIG. 7 is a cross-sectional view taken along a line B-B in FIG. 5.

Next, a biaxial load test apparatus configured to conduct a biaxial load test by using the above-described cross-shaped test specimen 10 will be described. FIG. 5 is a plan view of the biaxial load test apparatus suitable for the biaxial load test for the cross-shaped test specimen. FIG. 6 is a cross-sectional view taken along the line A-A in FIG. 5. FIG. 7 is a cross-sectional view taken along the line B-B in FIG. 5. As illustrated in FIG. 5, a biaxial load test apparatus 100 includes: a first frame 30 having a first loading unit (first loading part) 20 configured to apply a tensile load to the cross-shaped test specimen 10 along an axial direction X of the first load axis S1; and a second frame 50 having a second loading unit (second loading part) 60 configured to apply a tensile load to the cross-shaped test specimen 10 along an axial direction Y of the second load axis S2.

As illustrated in FIG. 5 and FIG. 6, the first frame 30 includes: a pair of reaction force frames 31 and 31 spaced in the axial direction X of the first load axis S1; and four reaction force rods 32 configured to connect these reaction force frames 31 and 31. As illustrated in FIG. 6, each of the reaction force frames 31 and 31 are installed via a corresponding one of first linear-motion bearings (first sliding units) 34 and 34 on a corresponding one of a pair of bases 33 and 33 disposed on an installation surface G. The first frame 30 is supported by the first linear-motion bearings 34 and 34 so as to be movable over a predetermined distance (for example, 0 mm to 20 mm) in the axial direction X of the first load axis S1. Thus, the first frame 30 is configured to be slidable on the bases 33 and 33 in the axial direction X of the first load axis S1.

The first loading unit 20 includes a center-hole jack (first jack) 21 fixed to one of the reaction force frames 31, and a center-hole load cell 22. The center-hole jack 21 is coupled via a tension rod 23A to a coupling unit 13 (FIG. 5) on one end side of the axial direction X of the first load axis S1 in the cross-shaped test specimen 10. The other one of the reaction force frames 31 is coupled via a tension rod 23B to another coupling unit 13 (FIG. 5) on the other end side of the axial direction X of the first load axis S1 in the cross-shaped test specimen 10. Thus, the cross-shaped test specimen 10 is supported by the first frame 30 via the tension rods 23A and 23B.

The center-hole jack 21 is a device configured to move the tension rod 23A forward and backward in the axial direction X of the first load axis S1, and is capable of applying a tensile load to the cross-shaped test specimen 10 in the axial direction X of the first load axis S1 via the tension rod 23A. The center-hole load cell 22 is configured to measure the magnitude of a tensile load applied by the center-hole jack 21.

On the other hand, as illustrated in FIG. 5 and FIG. 7, the second frame 50 includes: a pair of reaction force frames 51 and 51 spaced in the axial direction Y of the second load axis S2; and four reaction force rods 52 configured to connect these reaction force frames 51 and 51. As illustrated in FIG. 7, these reaction force rods 52 are positioned so as not to interfere with the reaction force rods 32 of the first frame 30. The reaction force frames 51 and 51 are installed, via second linear-motion bearings (second sliding units) 54 and 54, on a pair of bases 53 and 53 disposed on the installation surface G. The second frame 50 is supported by the second linear-motion bearings 54 and 54 so as to be movable over a predetermined distance (for example, 0 mm to 20 mm) in the axial direction Y of the second load axis S2. Thus, the second frame 50 is configured to be slidable on the bases 53 and 53 in the axial direction Y of the second load axis S2.

The second loading unit 60 includes a center-hole jack (second jack) 61 fixed to one of the reaction force frames 51, and a center-hole load cell 62. The center-hole jack 61 is coupled via a tension rod 63A to a coupling unit 13 (FIG. 5) on one end side of the axial direction Y of the second load axis S2 in the cross-shaped test specimen 10. The other one of the reaction force frames 51 is coupled via a tension rod 63B to a coupling unit 13 (FIG. 5) on the other end side of the axial direction Y of the second load axis S2 in the cross-shaped test specimen 10. Thus, the cross-shaped test specimen 10 is supported also by the second frame 50 via the tension rods 63A and 63B. In other words, the first frame 30 and the second frame 50 are connected to each other via the cross-shaped test specimen 10.

The center-hole jack 61 is a device configured to move the tension rod 63A forward and backward in the axial direction Y of the second load axis S2, and is capable of applying a tensile load to the cross-shaped test specimen 10 via the tension rod 63A in the axial direction Y of the second load axis S2. The center-hole load cell 62 is configured to measure the magnitude of a tensile load applied by the center-hole jack 61.

Figure 8:
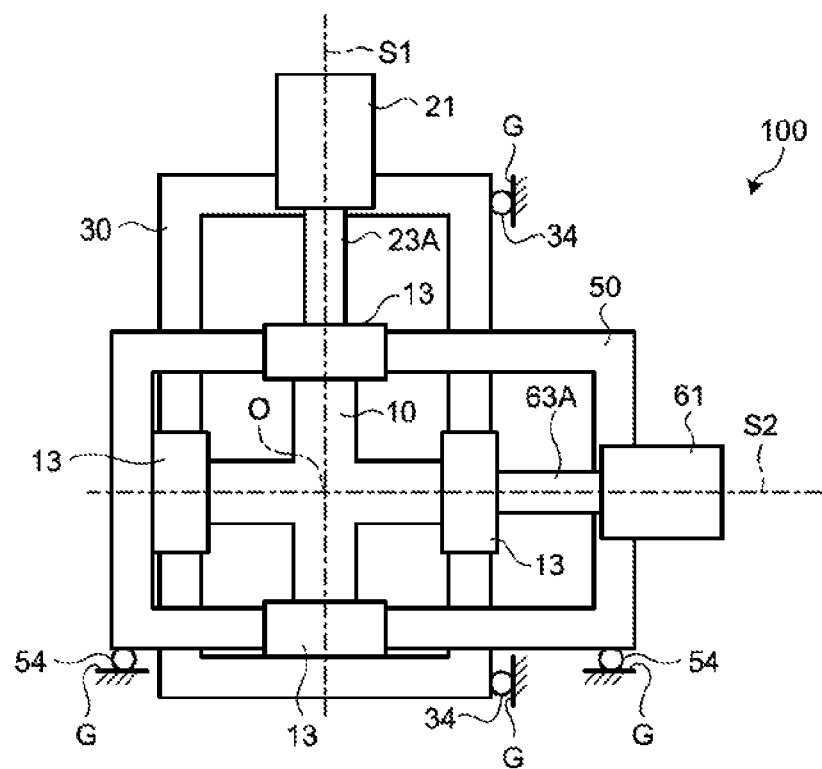
FIG. 8 is a schematic diagram illustrating an operation of a biaxial load test apparatus.
Figure 9:
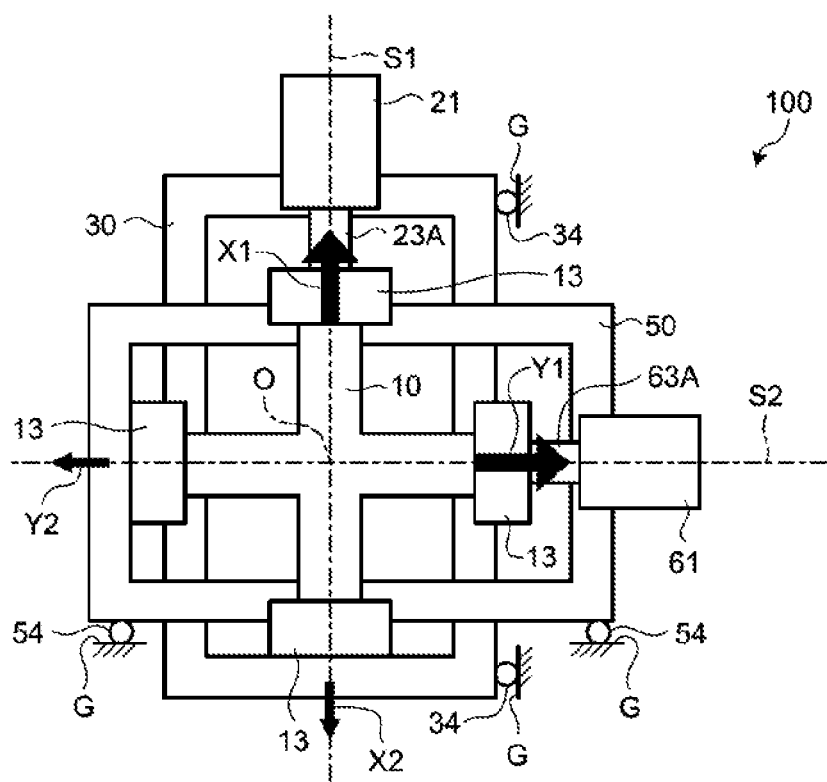
FIG. 9 is a schematic diagram illustrating the operation of the biaxial load test apparatus.

Next, an operation of the biaxial load test apparatus 100 will be described. FIG. 8 and FIG. 9 are schematic diagrams illustrating the operation of the biaxial load test apparatus. As illustrated in FIG. 8, the cross-shaped test specimen 10 is connected to the first frame 30 and the second frame 50 via the respective tension rods. As illustrated in FIG. 9, with this state kept, the center-hole jack 21 applies a tensile load to the cross-shaped test specimen 10 in an axial direction X1 of the first load axis S1.

In this case, the cross-shaped test specimen 10 is deformed and tends to stretch in the axial direction X1 due to the tensile load, but, since the cross-shaped test specimen 10 is connected with the second frame 50 via the tension rods 63A and 63B (FIG. 5), the cross-shaped test specimen 10 is restrained from stretching in the axial direction X1. Accordingly, a reaction force of the tensile load applied to the cross-shaped test specimen 10 acts in an axial direction X2, and the first frame 30 is moved in the axial direction X2 by the first linear-motion bearings 34 and 34, whereby the cross-shaped test specimen 10 stretches in both the axial directions X1 and X2.

Similarly, when the center-hole jack 61 applies a tensile load to the cross-shaped test specimen 10 in an axial direction Y1 of the second load axis S2, the cross-shaped test specimen 10 is deformed and tends to stretch in the axial direction Y1 due to the tensile load, but, since the cross-shaped test specimen 10 is connected with the first frame 30 via the tension rods 23A and 23B (FIG. 5), the cross-shaped test specimen 10 is restrained from stretching in the axial direction Y1. Accordingly, a reaction force of the tensile load applied to the cross-shaped test specimen 10 acts in an axial direction Y2, and the second frame 50 is moved in the axial direction Y2 by the second linear-motion bearings 54 and 54, whereby the cross-shaped test specimen 10 stretches in both the axial directions Y1 and Y2.

As described above, the biaxial load test apparatus 100 according to the present embodiment includes: the first frame 30 having the first loading unit 20 configured to apply a tensile load to the cross-shaped test specimen 10 along the axial direction X of the first load axis S1; the second frame 50 having the second loading unit 60 configured to apply a tensile load to the cross-shaped test specimen 10 along the axial direction Y of the second load axis S2; the first linear-motion bearing 34 configured to slide the first frame 30 in the axial direction X of the first load axis S1 with respect to the installation surface G; and the second linear-motion bearing 54 configured to slide the second frame 50 in the axial direction Y of the second load axis S2 with respect to the installation surface G, and thus, reaction forces of loads applied to the cross-shaped test specimen 10 in the axial directions X and Y respectively act on the first frame 30 and the second frame 50, so that the first frame 30 and the second frame 50 are moved by the first linear-motion bearing 34 and the second linear-motion bearing 54, respectively, in respective directions opposite to the directions in which the loads are applied. Thus, a combined biaxial load is prevented from being applied to the arms 12 of the cross-shaped test specimen 10, and a pure load can be applied along each of the axial directions X and Y.

In the present embodiment, the first frame 30 and the second frame 50 move in respective directions opposite to the directions in which the loads are applied, and therefore, even when a tensile load is applied to the cross-shaped test specimen 10, the center O of the cross-shaped test specimen 10 is not shifted. This brings about an effect that, for example, observation can be easily performed on the occasion of a load-carrying capacity measurement of the plug in a through-hole 14 positioned at the center O of the cross-shaped test specimen 10 or a fluid leakage test.

In the present embodiment, the first loading unit 20 and the second loading unit 60 are provided, and hence by operating the first loading unit 20 and the second loading unit 60 independently, loads of different magnitudes can be applied in the respective axial directions X and Y.

Figure 10:
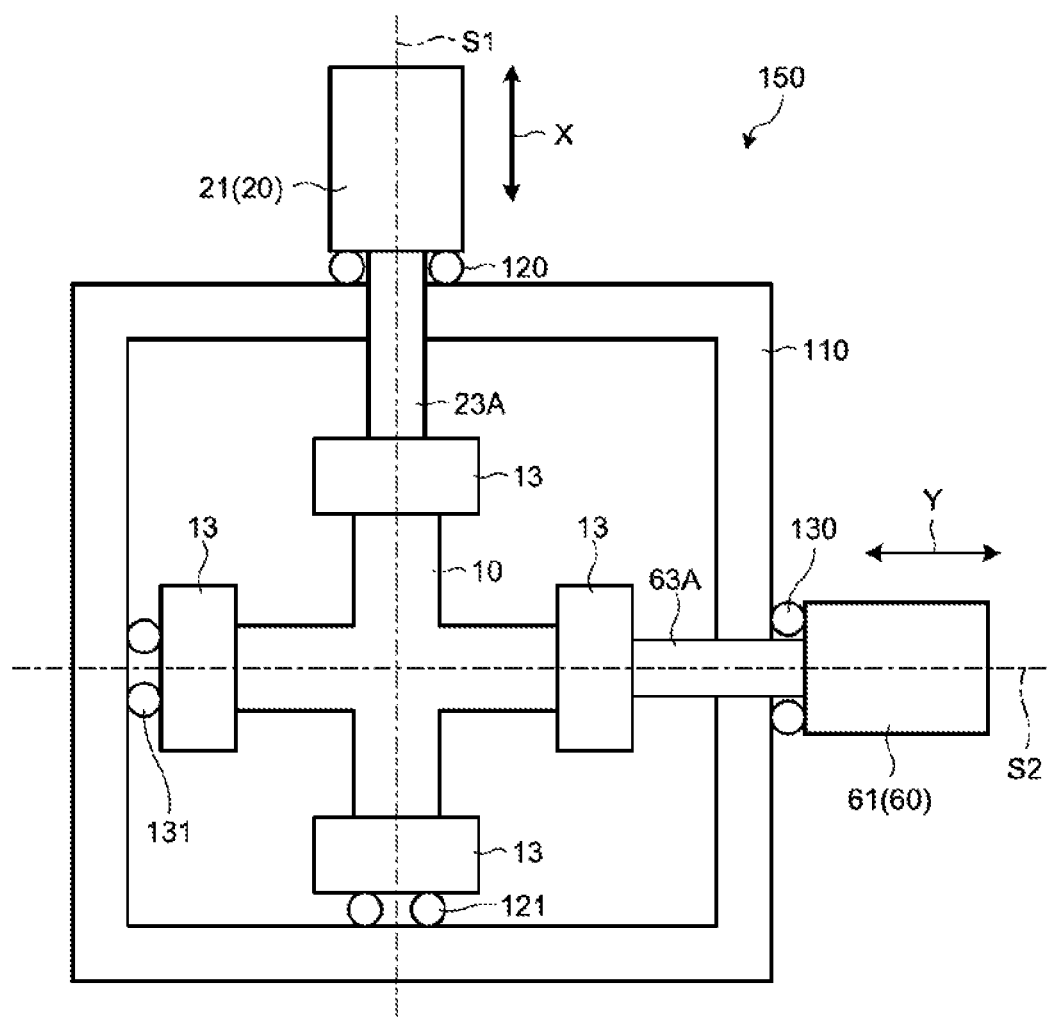
FIG. 10 is a schematic diagram of a biaxial load test apparatus according to another embodiment.

Next, a biaxial load test apparatus 150 according to another embodiment will be described. FIG. 10 is a schematic diagram of the biaxial load test apparatus according to the embodiment. As illustrated in FIG. 10, the biaxial load test apparatus 150 includes: a frame 110 installed on an installation surface (not-illustrated); the first loading unit 20 configured to apply a tensile or compressive load to the cross-shaped test specimen 10 along the axial direction X of the first load axis S1; and the second loading unit 60 configured to apply a tensile or compressive load to the cross-shaped test specimen 10 along the axial direction Y of the second load axis S2. The first loading unit 20 and the second loading unit 60 are the same as those of the above-described configuration, and therefore, descriptions thereof will be omitted. Furthermore, in FIG. 10, only the rods 23A and 63A are illustrated, whereas illustrations of rods corresponding to the rods 23B and 63B (FIG. 5) are omitted.

The biaxial load test apparatus 150 further includes: first linear-motion bearings (first sliding units) 120 and 121 configured to slide the first loading unit 20 and the cross-shaped test specimen 10 in the axial direction Y of the second load axis S2 with respect to the frame 110; and second linear-motion bearings (second sliding units) 130 and 131 configured to slide the second loading unit 60 and the cross-shaped test specimen 10 in the axial direction X of the first load axis S1 with respect to the frame 110. The first linear-motion bearing 120 slidably supports the jack 21 of the first loading unit 20 with respect to the frame 110, whereas the first linear-motion bearing 121 slidably supports the coupling unit 13 (or the rod 23B not illustrated) of the cross-shaped test specimen 10 with respect to the frame 110.

Similarly, the second linear-motion bearing 130 slidably supports the jack 61 of the second loading unit 60 with respect to the frame 110, whereas the second linear-motion bearing 131 slidably supports the coupling unit 13 (or the rod 63B not illustrated) of the cross-shaped test specimen 10 with respect to the frame 110.

With this configuration, when the jack 21 applies a load to the cross-shaped test specimen 10 in the axial direction X of the first load axis S1, the cross-shaped test specimen 10 is deformed to be stretched or shortened in the axial direction X due to the load. In this case, with the deformation of the cross-shaped test specimen 10 in the axial direction X, the second loading unit 60 connected to the cross-shaped test specimen 10 is moved together with the cross-shaped test specimen 10 in the axial direction X by the second linear-motion bearings 130 and 131.

Similarly, when the jack 61 applies a load to the cross-shaped test specimen 10 in the axial direction Y of the second load axis S2, the cross-shaped test specimen 10 is deformed to be stretched or shortened in the axial direction Y due to the load. In this case, with the deformation of the cross-shaped test specimen 10 in the axial direction Y, the first loading unit 20 connected to the cross-shaped test specimen 10 is moved together with the cross-shaped test specimen 10 in the axial direction Y by the first linear-motion bearings 120 and 121.

As described above, the biaxial load test apparatus 150 according to the present embodiment includes: the frame 110 installed on the installation surface (not-illustrated); the first loading unit 20 configured to apply a tensile or compressive load to the cross-shaped test specimen 10 along the axial direction X of the first load axis S1; the second loading unit 60 configured to apply a tensile or compressive load to the arms 12 of the cross-shaped test specimen 10 along the axial direction Y of the second load axis S2; and the first linear-motion bearings 120 and 121 (first sliding units) configured to slide the first loading unit 20 and the cross-shaped test specimen 10 in the axial direction Y of the second load axis S2 with respect to the frame 110, in which the first loading unit 20 and the second loading unit 60 move together with the cross-shaped test specimen 10 in the axial direction X or the axial direction Y with respect to the frame 110. This configuration prevents a combined biaxial load from being applied to the cross-shaped test specimen 10, and thus allows a pure load to be applied along each of the axial directions X and Y.

In the present embodiment, the first loading unit 20 and the second loading unit 60 are provided, and hence by operating the first loading unit 20 and the second loading unit 60 independently, loads of different magnitudes can be applied in the respective axial directions X and Y.

While embodiments according to the present invention have been described herein, these embodiments have been presented by way of example only, and are not intended to limit the scope of the invention. Indeed, these embodiments may be embodied in a variety of other forms; furthermore, various omissions, substitutions, and changes in the form of the embodiments described herein may be made without departing from the spirit of the invention. The accompanying claims and their equivalents are intended to cover such forms or modifications of the embodiments as would fall within the scope and spirit of the invention. For example, a configuration has been described herein in which, in the above-described biaxial load test apparatuses 100 and 150, the cross-shaped test specimen 10 provided with a plurality of through-holes 14 aligned in the main body 11 is employed as a test specimen, but, a cross-shaped test specimen not provided with any through-hole may also be employed. Furthermore, in the embodiments, the biaxial load test apparatus 100 is configured so as to include: the first loading unit 20 configured to apply a tensile load to the cross-shaped test specimen 10 in the axial direction X of the first load axis S1; and the second loading unit 60 configured to apply a tensile load to the cross-shaped test specimen 10 in the axial direction Y of the second load axis S2, but, the biaxial load test apparatus may include a first loading unit and a second loading unit configured to apply not only a tensile load but also a compressive load in the respective axial directions X and Y.

REFERENCE SIGNS LIST

10 Cross-shaped test specimen (test specimen, biaxial load test specimen)
11 Main body
12 Arm
13 Coupling unit
13A Hole
14 Through-hole
15 Ligament
16 Slit groove
20 First loading unit (first loading part)
21, 61 Center-hole jack (jack)
22, 62 Center-hole load cell
23A, 23B, 63A, 63B Tension rod (rod)
30 First frame
31, 51 Reaction force frame
32, 52 Reaction force rod
33, 53 Base
34, 120, 121 First linear-motion bearing (first sliding unit)
50 Second frame
54, 130, 131 Second linear-motion bearing (second sliding unit)
60 Second loading unit (second loading part)
100, 150 Biaxial load test apparatus
110 Frame
G Installation surface
LA Extension
LC Center line
S1 First load axis
S2 Second load axis

The invention claimed is:

1. A biaxial load test specimen, comprising:
a main body having a plurality of through-holes aligned along axial directions of two load axes orthogonal to each other; and
four arms extending from the main body in the respective axial directions of the load axes,
wherein each of the arms has a plurality of slit grooves extending, on respective extensions of the through-holes aligned in the axial directions, along the respective axial directions, and a center line of each slit groove is positioned on a corresponding extension of the through-holes.

2. The biaxial load test specimen according to claim 1, wherein the slit grooves have a groove width equal to a diameter of the through-holes.

3. A biaxial load test apparatus configured to perform a load test for a test specimen by applying a load to the test specimen along each of axial directions of a first load axis and a second load axis which are orthogonal to each other, the apparatus comprising:
a first frame including a first loading unit configured to apply a tensile or compressive load to the test specimen along the axial direction of the first load axis;
a second frame including a second loading unit configured to apply a tensile or compressive load to the test specimen along the axial direction of the second load axis;
a first sliding unit configured to slide the first frame in the axial direction of the first load axis with respect to an installation surface; and
a second sliding unit configured to slide the second frame in the axial direction of the second load axis with respect to the installation surface,
wherein the test specimen includes a main body having a plurality of through-holes aligned along axial directions of two load axes orthogonal to each other, and four arms extending from the main body in the respective axial directions of the load axes, wherein each of the arms has a plurality of slit grooves extending, on respective extensions of the through-holes aligned in the axial directions, along the respective axial directions.

4. A biaxial load test apparatus configured to perform a load test for a test specimen by applying a load to the test specimen along each of axial directions of a first load axis and a second load axis which are orthogonal to each other, the apparatus comprising:
a frame to be installed on an installation surface;
a first loading unit configured to apply a tensile or compressive load to the test specimen along the axial direction of the first load axis;
a second loading unit configured to apply a tensile or compressive load to the test specimen along the axial direction of the second load axis;
a first sliding unit configured to slide the first loading unit and the test specimen in the axial direction of the second load axis with respect to the frame; and
a second sliding unit configured to slide the second loading unit and the test specimen in the axial direction of the first load axis with respect to the frame, wherein the test specimen includes a main body having a plurality of through-holes aligned along axial directions of two load axes orthogonal to each other, and four arms extending from the main body in the respective axial directions of the load axes, wherein each of the arms has a plurality of slit grooves extending, on respective extensions of the through-holes aligned in the axial directions, along the respective axial directions, and a center line of each slit groove is positioned on a corresponding extension of the through-holes.

5. A biaxial load test method, comprising:
providing at least one of the through-holes formed in the main body of the biaxial load test specimen according to claim 1 with a sealing plug configured to seal the at least one of the through-holes;
applying a load to the arms of the biaxial load test specimen along the respective axial directions of the load axes; and
in a state where the load is applied, applying a pulling load to pull out the sealing plug from the through-hole.

6. A biaxial load test method, comprising:
fixing a pipe to at least one of the through-holes formed in the main body of the biaxial load test specimen according to claim 1;
applying a load to the arms of the biaxial load test specimen along the respective axial directions of the load axes; and
in a state where the load is applied, filling one end side of the pipe with a fluid pressurized to a predetermined pressure.

7. A biaxial load test specimen, comprising:
a main body having a plurality of through-holes aligned along axial directions of two load axes orthogonal to each other and arranged in a square matrix; and
four arms extending from the main body in the respective axial directions of the load axes,
wherein each of the arms has a plurality of slit grooves extending, on respective extensions of the through-holes aligned in the axial direction, along the respective axial directions.

8. A biaxial load test apparatus configured to perform a load test for a test specimen by applying a load to the test specimen along each of axial directions of a first load axis and a second load axis which are orthogonal to each other, the apparatus comprising:
a frame to be installed on an installation surface;
a first loading unit configured to apply a tensile or compressive load to the test specimen along the axial direction of the first load axis;
a second loading unit configured to apply a tensile or compressive load to the test specimen along the axial direction of the second load axis;
a first sliding unit configured to slide the first loading unit and the test specimen in the axial direction of the second load axis with respect to the frame; and
a second sliding unit configured to slide the second loading unit and the test specimen in the axial direction of the first load axis with respect to the frame, wherein
the test specimen is further comprising:
a main body having a plurality of through-holes aligned along axial directions of two load axes orthogonal to each other and arranged in a square matrix; and
four arms extending from the main body in the respective axial directions of the load axes,
wherein each of the arms has a plurality of slit grooves extending, on respective extensions of the through-holes aligned in the axial direction, along the respective axial directions.

* * * * *